United States Patent
Li et al.

(10) Patent No.: US 10,002,283 B2
(45) Date of Patent: Jun. 19, 2018

(54) MOBILE DEVICE AND SCREEN MODULE THEREOF, METHOD AND APPARATUS FOR ACQUIRING FINGERPRINT AND ELECTRONIC DEVICE

(71) Applicant: Xiaomi Inc., Beijing (CN)

(72) Inventors: Guosheng Li, Beijing (CN); Anyu Liu, Beijing (CN); Shanrong Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/155,234

(22) Filed: May 16, 2016

(65) Prior Publication Data

US 2017/0046558 A1 Feb. 16, 2017

(30) Foreign Application Priority Data

Aug. 13, 2015 (CN) .......................... 2015 1 0498544

(51) Int. Cl.
*G06K 9/00* (2006.01)
*G06F 3/041* (2006.01)

(52) U.S. Cl.
CPC ....... *G06K 9/00087* (2013.01); *G06F 3/0412* (2013.01); *G06F 3/0414* (2013.01); *G06K 9/00013* (2013.01); *G06F 2203/0338* (2013.01)

(58) Field of Classification Search
CPC ....... G06T 2200/24; G06T 2207/30004; G06T 7/73; G06F 3/0488; G06F 2203/04104; G06K 9/00006; G06K 9/00067; G06K 9/00087; G06K 9/0008; G06K 15/005; G06K 2009/0006; G06K 9/00013; G06K 9/00228
See application file for complete search history.

(56) References Cited

U.S. PATENT DOCUMENTS 5,828,773 A * 10/1998 Setlak .................. G06K 9/0002
382/126
6,401,551 B1 6/2002 Kawahara et al.
8,019,131 B2 9/2011 Wong et al.
(Continued)

FOREIGN PATENT DOCUMENTS

CN 1283833 A 2/2001
CN 101286190 A 10/2008
(Continued)

OTHER PUBLICATIONS

Office Action dated Jun. 30, 2017 in Korean Patent Application No. 10-2016-7028647.
(Continued)

*Primary Examiner* — Jingge Wu
(74) *Attorney, Agent, or Firm* — Oblon, McClelland, Maier & Neustadt, L.L.P.

(57) ABSTRACT

The present disclosure relates to an apparatus, a method, and an electronic device. The apparatus includes a display screen; a processor; a fingerprint sensor configured to acquire fingerprint data, wherein the fingerprint sensor is located in a content displaying area of the display screen; and a data transmission line configured to transmit the fingerprint data from the fingerprint sensor to the processor, wherein the data transmission line includes a first end connected to the fingerprint sensor and a second end connected to the processor.

15 Claims, 14 Drawing Sheets

(56) References Cited

U.S. PATENT DOCUMENTS

| | | | |
|---|---|---|---|
| 9,489,127 B2* | 11/2016 | Kim | G06F 3/041 |
| 2002/0163601 A1 | 11/2002 | Min et al. | |
| 2006/0012570 A1* | 1/2006 | Yumoto | G06F 3/03547 |
| | | | 345/157 |
| 2008/0253624 A1 | 10/2008 | Wong et al. | |
| 2011/0018893 A1 | 1/2011 | Kim et al. | |
| 2012/0163520 A1 | 6/2012 | Liu et al. | |
| 2012/0242635 A1* | 9/2012 | Erhart | G06F 1/1626 |
| | | | 345/207 |
| 2013/0076485 A1* | 3/2013 | Mullins | G06F 21/32 |
| | | | 340/5.83 |
| 2013/0208103 A1* | 8/2013 | Sands | G06F 21/31 |
| | | | 348/78 |
| 2013/0215011 A1 | 8/2013 | Ke | |
| 2014/0282059 A1 | 9/2014 | Oh et al. | |
| 2014/0333328 A1 | 11/2014 | Nelson et al. | |
| 2015/0029158 A1 | 1/2015 | Kim et al. | |
| 2015/0074615 A1* | 3/2015 | Han | G06K 9/00033 |
| | | | 715/863 |
| 2015/0177884 A1* | 6/2015 | Han | G06F 3/044 |
| | | | 345/174 |
| 2015/0363038 A1* | 12/2015 | Luo | G06F 3/0488 |
| | | | 345/173 |
| 2016/0034738 A1* | 2/2016 | Luo | G06K 9/001 |
| | | | 382/125 |
| 2016/0154956 A1* | 6/2016 | Fadell | G06F 21/316 |
| | | | 726/19 |
| 2017/0103252 A1* | 4/2017 | Li | G06K 9/0002 |
| 2017/0140201 A1* | 5/2017 | Li | G06F 3/0414 |

FOREIGN PATENT DOCUMENTS

| | | |
|---|---|---|
| CN | 103309549 A | 9/2013 |
| CN | 105184228 A | 12/2015 |
| KR | 10-0501070 B1 | 7/2005 |
| WO | WO 03/071342 A1 | 8/2003 |

OTHER PUBLICATIONS

International Search Report and Written Opinion dated Apr. 28, 2016 in PCT/CN2015/099043 (with English language translation).
Extended European Search Report dated Dec. 16, 2016 in Patent Application No. 16167132.6.
Japanese Office Action issued in Japanese Application No. 2016-553796 dated Dec. 26, 2017 (w/ English Translation).

* cited by examiner

MOBILE DEVICE AND SCREEN MODULE THEREOF, METHOD AND APPARATUS FOR ACQUIRING FINGERPRINT AND ELECTRONIC DEVICE

CROSS-REFERENCE TO RELATED APPLICATIONS

This application is based on and claims priority to Chinese Patent Application Serial No. CN 201510498544.X, filed with the State Intellectual Property Office of P. R. China on Aug. 13, 2015, the entire contents of which are incorporated herein by reference.

TECHNICAL FIELD

The present disclosure generally relates to a field of fingerprint acquisition technology, and more particularly, to a screen module of a mobile device and a mobile device.

BACKGROUND

More and more mobile devices have been equipped with the fingerprint sensor, so as to identify the user identity by acquiring and identifying the fingerprint of the user.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an apparatus that includes a display screen; a processor; a fingerprint sensor configured to acquire fingerprint data, wherein the fingerprint sensor is located in a content displaying area of the display screen; and a data transmission line configured to transmit the fingerprint data from the fingerprint sensor to the processor, wherein the data transmission line includes a first end connected to the fingerprint sensor and a second end connected to the processor.

The display screen includes a liquid crystal display (LCD), and a vertical projection of the fingerprint sensor is located within a vertical projection of a black matrix area of a sub-pixel of the LCD. The fingerprint sensor is disposed on a surface of a color filter of the LCD.

The display screen includes a plurality of fingerprint sensors, and the plurality of fingerprint sensors are disposed adjacently to each other within a predetermined area of the display screen. The fingerprint sensor is one of a plurality of fingerprint sensors arranged in the content displaying area.

The data transmission line is one of a plurality of data transmission lines, and each one of the plurality of fingerprint sensors corresponds to a respective one of the plurality of the data transmission lines.

The fingerprint sensor is one of a plurality of fingerprint sensors, the data transmission line is one of a plurality of data transmission lines, a number of the data transmission lines is less than a number of the fingerprint sensors, and the screen module includes a gated control line including a first end and a second end. The first end of the gated control line is connected to the fingerprint sensor and the second end of the gated control line is connected to a controller. The fingerprint sensor and at least one other fingerprint sensor of the plurality of fingerprint sensors are connected to a same data transmission line of the plurality of data transmission lines. The gated control line is configured to control the fingerprint sensor to connect with or disconnect from the same data transmission line according to a control instruction of the controller, such that the same data transmission line is connected with only one fingerprint sensor at a time.

An output of the fingerprint sensor is connected to the same data transmission line via a switch, and the gated control line is connected to a control terminal of the switch.

The apparatus also includes a first row of fingerprint sensors in a first edge direction of the display screen that is connected to the same data transmission line, and a second row of fingerprint sensors in a second edge direction of the display screen that is connected to a same gated control line. The first edge direction is perpendicular to the second edge direction. The fingerprint sensor is in a continuous on state.

The display screen includes a touch sensor configured to detect a touch operation on the display screen from a user and determine an area corresponding to the touch operation. The fingerprint sensor is located in the area and is configured to activate when the touch operation is detected by the touch sensor.

The touch sensor is configured to detect at least one of a finger swipe and a finger tap. The touch sensor includes a pressure sensor that is configured to detect a pressing operation on the display screen.

Aspects of the disclosure also provide a method that includes detecting a touch operation on a display screen of a mobile device; determining an area on the display screen corresponding to the touch operation; and acquiring fingerprint data in the area via a fingerprint sensor that is located in the area on the display screen.

The display screen includes a touch sensor that is configured to detect the touch operation. Detecting the touch operation includes detecting a pressing operation on the display screen via a pressure sensor. The fingerprint sensor is arranged in a content displaying area of the display screen.

Aspects of the disclosure also provide an electronic device including a display screen, a processor, a memory for storing instructions executable by the processor, and at least one fingerprint sensor connected to the processor by at least one data transmission line including a first end and a second end. The first end is connected to the at least one fingerprint sensor and the second end is connected to the processor. The processor is configured to: detect a touch operation on the display screen module via a touch sensor; determine an area on the display screen corresponding to the touch operation; and acquire fingerprint data in the area via the at least one fingerprint sensor that is located in the area on the display screen. The processor is configured to detect at least one of a finger swipe and finger tap via the touch sensor. The processor is configured to detect a pressing operation on the display screen via a pressure sensor.

The technical solution provided by the aspects of the present disclosure may include the following advantages.

It can be seen from the aspects above that, by disposing the fingerprint sensor in the content displaying area of the screen module of the mobile device, it may be possible to avoid creating an opening on a shell of the mobile device, it is not required to add an additional stacking structure, and it helps to simplify a structure of the mobile device.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
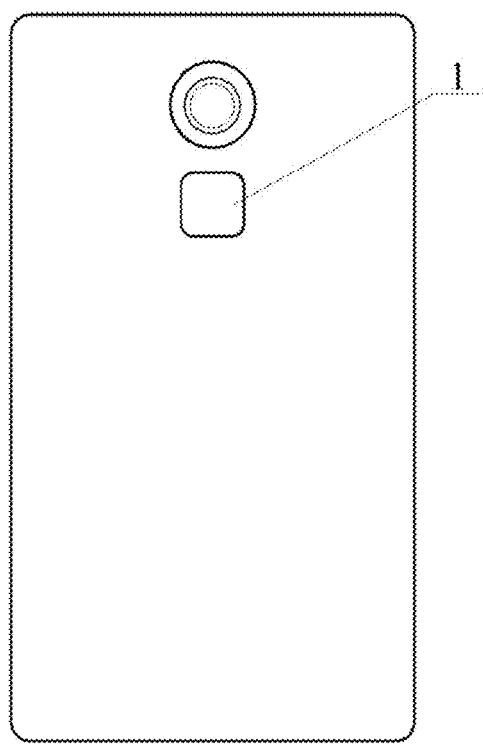
FIGS. 1-2 are schematic diagrams illustrating a mobile device in the related art.

FIG. 1 is a schematic diagram illustrating a mobile device in the related art. As shown in FIG. 1, in a technical solution of the related art, a fingerprint sensor 1 is disposed on a back surface of a mobile device. However, this arrangement has the following technical problems. On the one hand, in order to dispose the fingerprint sensor 1, an opening is required to be formed on a back board of the mobile device, thus destroying an integrity of the back board, and affecting an appearance and a strength of the back board; on the other hand, since a user cannot simultaneously pay attention to a content displayed on a screen on a front surface of the mobile device and the fingerprint sensor 1 on the back surface, the user experience is affected.

Figure 2:
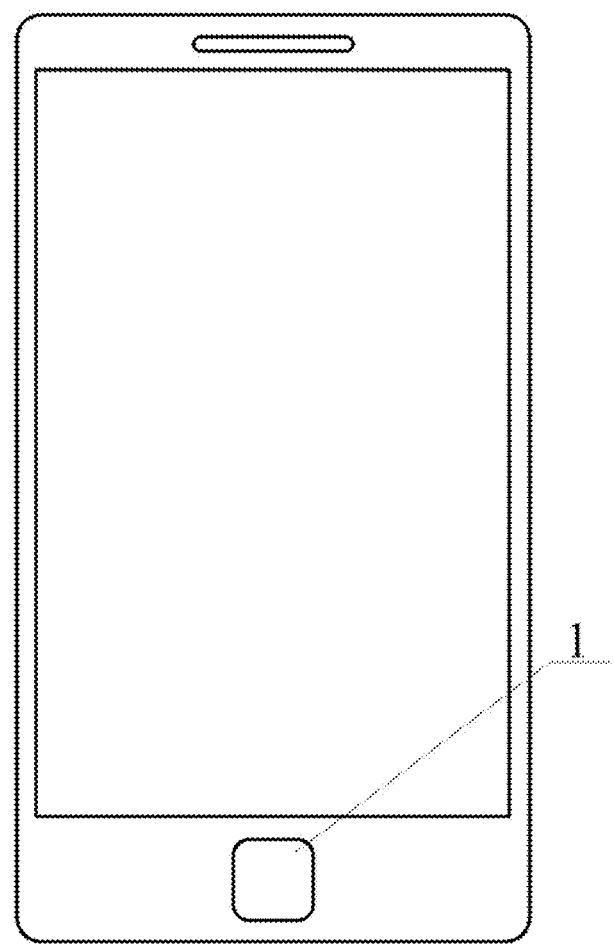

FIG. 2 is a schematic diagram illustrating another mobile device in the related art. As shown in FIG. 2, in another technical solution of the related art, the fingerprint sensor 1 is disposed on physical keys on the front surface of the mobile device. In this way, although the disadvantages shown in FIG. 1 are overcome, an additional stacking structure is required to be supplied on the physical keys, thus increasing a complexity in structure.

Therefore, by making a structural improvement for the mobile device, the present disclosure solves the technical problems above existing in the related art.

Figure 3:
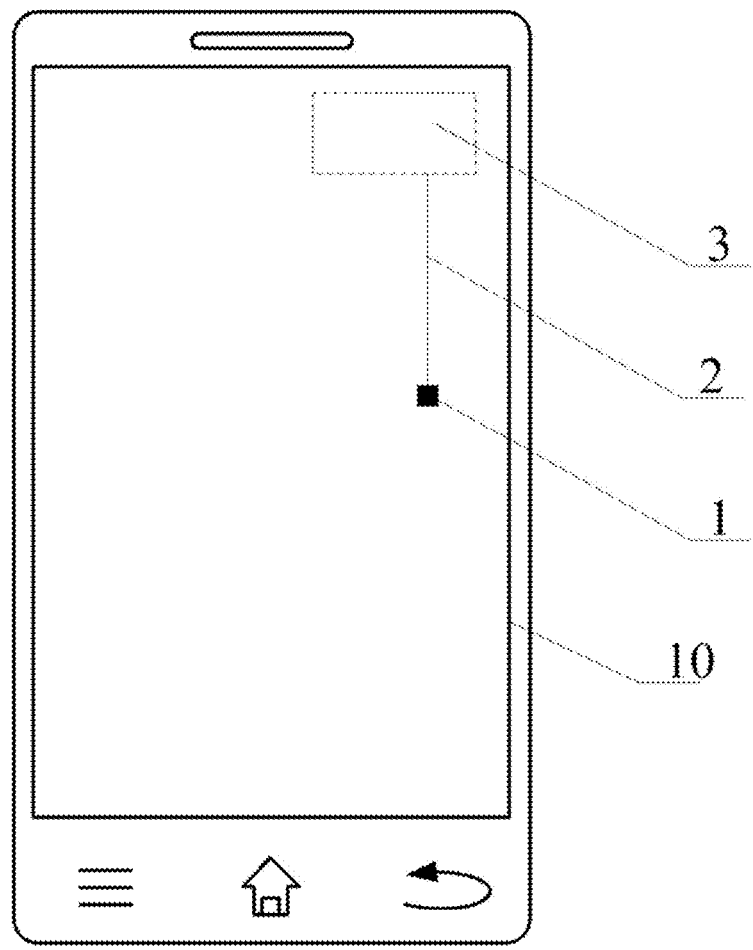
FIG. 3 is a schematic diagram illustrating a screen module of a mobile device, according to an example aspect of the present disclosure.

FIG. 3 is a schematic diagram illustrating a screen module of a mobile device, according to an example aspect. As shown in FIG. 3, the screen module may comprise: a fingerprint sensor 1 and a data transmission line 2.

The fingerprint sensor 1 is located in a content displaying area 10 of the screen module, for performing a fingerprint acquisition.

A first end and a second end of the data transmission line 2 are connected to the fingerprint sensor 1 and a processing component 3 in the mobile device respectively, for transmitting fingerprint data acquired by the fingerprint sensor 1 to the processing component 3.

In this aspect, the content displaying area 10 refers to an area in the screen module which is configured to realize a content displaying function, for example, a VA (View Area) of an LCD displaying module (not shown in FIG. 3) corresponding to the screen module.

In this aspect, by disposing the fingerprint sensor 1 into the content displaying area 10 of the screen module of the mobile device, the fingerprint sensor 1 and a displaying content in the content displaying area 10 are located in a same area, and the user may view the displaying content in the content displaying area 10 and perform a fingerprint acquisition via the fingerprint sensor 1 simultaneously.

Further, since the fingerprint sensor 1 is disposed in the screen module, it is not required to add a stacking structure on physical keys of the mobile device, and it helps to simplify a structure of the mobile device and to reduce a complexity.

1. Fingerprint Sensor 1 and LCD Displaying Module

Figure 4:
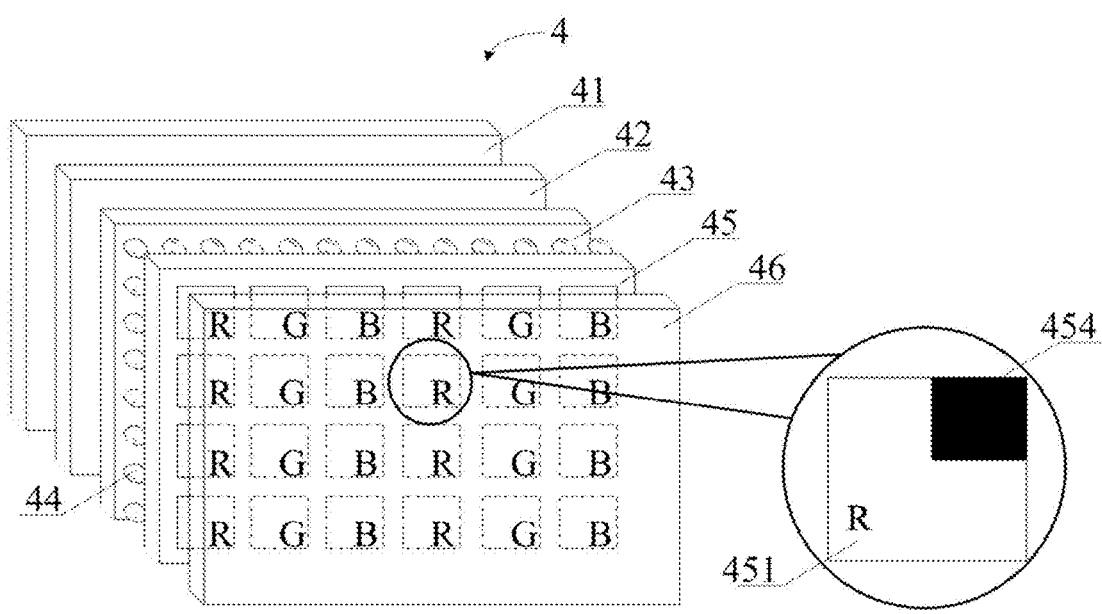
FIG. 4 is a schematic diagram illustrating an LCD displaying module of a screen module of a mobile device, according to an example aspect of the present disclosure.

As an example aspect, the fingerprint sensor 1 may be made of a transparent material, thus avoiding affecting the content displaying of the LCD displaying module 4 (shown in FIG. 4).

As another example aspect, a volume of the fingerprint sensor 1 may be reduced, such that the fingerprint sensor 1 is indistinguishable for eyes of the user during the use of mobile device, thus avoiding affecting the content displaying of the LCD displaying module 4.

As yet another example aspect, as shown in FIG. 4, the LCD displaying module 4 in the screen module may comprise: a backlight 41, a lower polarizer 42, an array glass substrate 43, a liquid crystal layer 44, a color filter 45 and an upper polarizer 46, etc. Red, green and blue sub-pixels are formed on the color filter 45.

Referring to a partial enlarged drawing in FIG. 4, a red sub-pixel is taken as an example. For all areas of the sub-pixel, only a left-lower pixel area 451 is for displaying a corresponding red content, and for example, a right-upper BM (black matrix) area 454 is not for displaying content.

Therefore, a vertical projection of the fingerprint sensor 1 may be located within a vertical projection of the BM area 454 of the sub-pixel of the LCD displaying module 4, thus avoiding affecting the content displaying of the LCD displaying module 4.

2. Disposing Location

Figure 5:
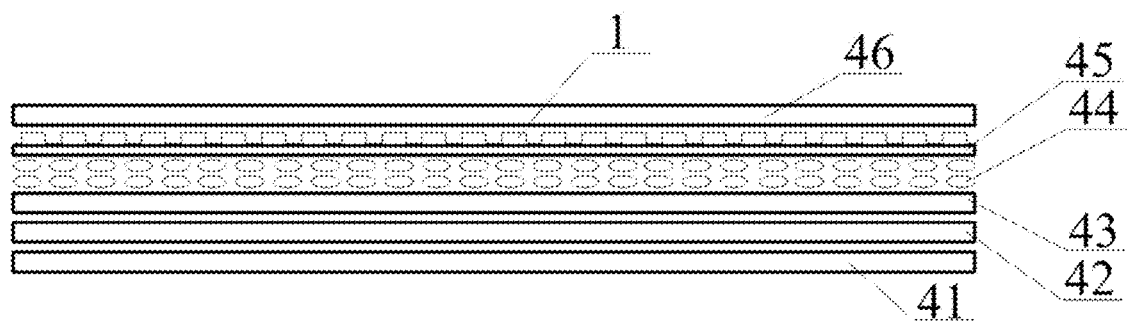
FIG. 5 is a schematic diagram illustrating an LCD displaying module of a screen module of a mobile device, according to an example aspect of the present disclosure.

As an example aspect, when the vertical projection of the fingerprint sensor 1 is located within the vertical projection of the BM area 454 of the sub-pixel of the LCD displaying module 4, as shown in FIG. 5, the fingerprint sensor 1 may be directly disposed on a surface of the color filter 45 and be located in the BM area 454 (see FIG. 4, which is not shown in FIG. 5). Because the fingerprint sensor 1 is disposed inside the LCD displaying module 4, it may not affect a packaging process of the LCD displaying module 4, such as an adhesion of the LCD displaying module 4 with other components.

3. Arrangement

Figure 6:
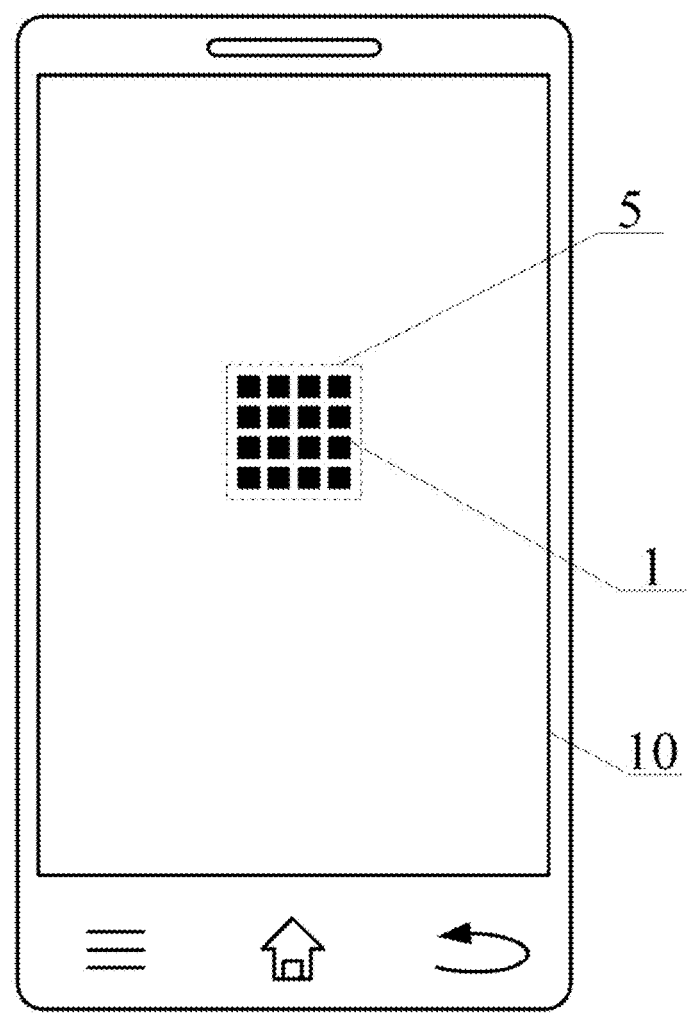
FIG. 6 is a schematic diagram illustrating another screen module of a mobile device, according to an example aspect of the present disclosure.

The screen module of the mobile device may comprise a plurality of fingerprint sensors. For example as shown in FIG. 6, there are 16 fingerprint sensors disposed in total. The plurality of fingerprint sensors 1 are arranged adjacently to each other to form a fingerprint identification array 5. The fingerprint identification array 5 may be located at any location of the content displaying area 10. For example, the array 5 is located at a center of the content displaying area 10 in FIG. 6, and configured for acquiring and identifying fingerprint of the user as a whole.

The rectangle array 5 in FIG. 6 is only an example aspect, and the plurality of fingerprint sensors 1 may be arranged in any manner, which is not limited in the present disclosure.

4. Data Transmission Manner

As an example aspect, the fingerprint sensors 1 in the screen module are one-to-one corresponding to data transmission lines 2. Each fingerprint sensor 1 may perform a fingerprint acquisition on the user at any time, and transmit fingerprint data acquired to a processing component 3 via the data transmission line 2.

As another example aspect, in order to reduce the number of the data transmission lines 2 and to simplify line, many fingerprint sensors 1 may share a data transmission line 2, namely, the number of the data transmission lines 2 is less than the number of the fingerprint sensors 1. Because the number of the data transmission lines 2 is less, many fingerprint sensors 1 sharing one data transmission line 2 transmit corresponding fingerprint acquisition data by time division multiplexing. Thus, it is required to control the time when the fingerprint sensors 1 occupy the data transmission line 2.

Figure 7:
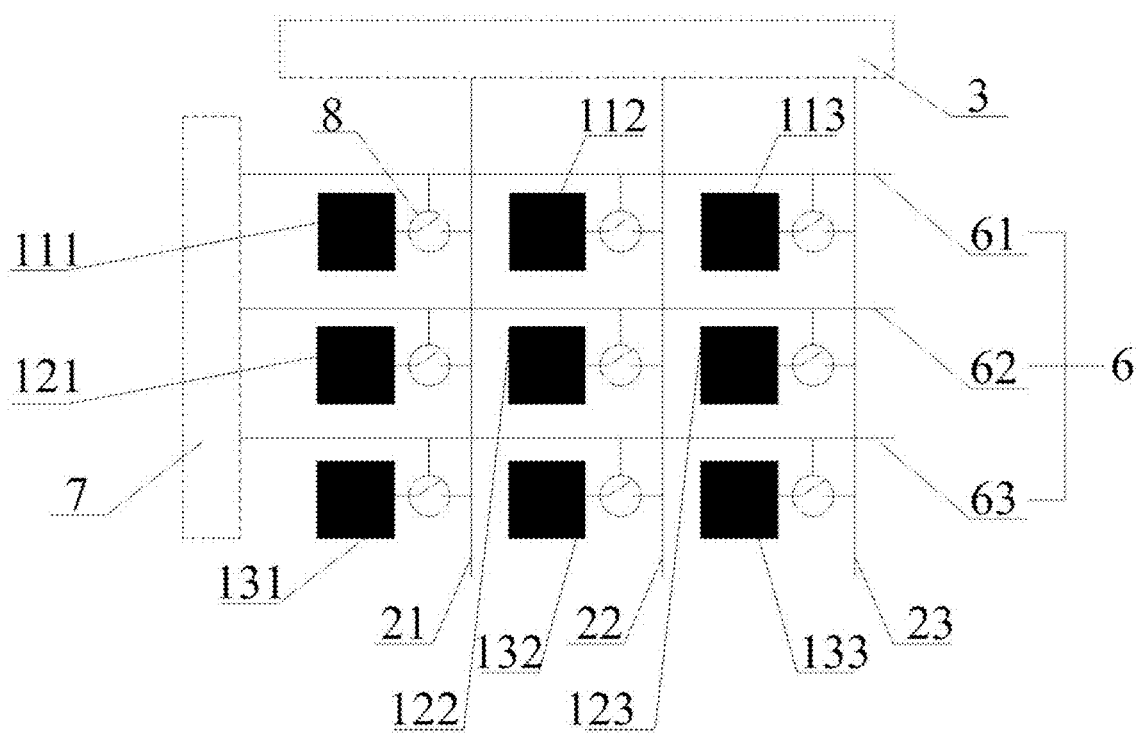
FIG. 7 is a schematic diagram showing an arrangement of fingerprint sensors, according to an example aspect of the present disclosure.

As shown in FIG. 7, assuming that the fingerprint sensors 1 in the screen module are sequentially arranged in an edge direction of the screen module respectively. Namely, fingerprint sensors 111, 112 and 113 are arranged in a first row in a first edge direction (i.e., a transverse edge direction), fingerprint sensors 121, 122 and 123 are arranged in a second row in the transverse edge direction, fingerprint sensors 131, 132 and 133 are arranged in a third row in the transverse edge direction, the fingerprint sensors 111, 121 and 131 are arranged in a first column in a second edge direction (i.e., a longitudinal edge direction), the fingerprint sensors 112, 122, 132 are arranged in a second column in the longitudinal edge direction, and the fingerprint sensors 113, 123 133 are arranged in a third column in the longitudinal edge direction. Thus, the screen module may further comprise a gated control line 6.

In this aspect, the gated control line 6 comprises three gated control lines (gated control lines 61, 62 and 63). A first end and a second end of the gated control line 6 are connected to the fingerprint sensor 1 (in this aspect comprising nine fingerprint sensors 111, 112, 113, 121, 122, 123, 131, 132, 133 described above) and a control component 7 in the mobile device respectively.

If the fingerprint sensor 1 and at least one other fingerprint sensor are connected to a same data transmission line 2 (in this aspect comprising three data transmission lines 21, 22 and 23 described above). For example, the fingerprint sensors 111, 121 and 131 are connected to the data transmission line 21, and the gated control lines 61 62 and 63 control the fingerprint sensors 111, 121 and 131 to connect with or disconnect from the same data transmission line 21 according to a control instruction from the control component 7, such that the data transmission line 21 is only connected with any one of the fingerprint sensors 111, 121 and 131 at a same moment.

An output of each of the plurality of fingerprint sensors 1 may be connected to the same data transmission line 2 via a switch element 8, and the gated control line 6 may be connected to a control terminal (an upper end in FIG. 7) of the switch element 8, so as to implement a switch control for the switch element 8.

In the aspect shown in FIG. 7, fingerprint sensors 1 in each row in a first edge direction of the screen module are connected to a same data transmission line 2; and fingerprint sensors 1 in each row in a second edge direction of the screen module are connected to a same gated control line 2, the first edge direction is perpendicular to the second edge direction. For example, the first edge direction is the longitudinal direction, and the second edge direction is the transverse direction. Then the control component 7 may control the gated control lines 61, 62 and 63 to be turned on successively. When the gated control line 61 is controlled to be turned on, and the gated control lines 62 and 63 are controlled to be turned off, the fingerprint sensors 111, 112 and 113 conduct data transmission via the data transmission lines 21, 22 and 23, respectively; when the gated control line 62 is controlled to be turned on, and the gated control lines 61 and 63 are controlled to be turned off, the fingerprint sensors 121, 122 and 123 conduct data transmission via the data transmission lines 21, 22 and 23, respectively; when the gated control line 63 is controlled to be turned on, and the gated control lines 61 and 62 are controlled to be turned off, the fingerprint sensors 131, 132 and 133 conduct data transmission via the data transmission lines 21, 22 and 23, respectively.

FIG. 7 is only an example aspect, and the plurality of fingerprint sensors 1 may be arranged in any manner, and the data transmission lines 2 and the gated control lines 6 are adjusted correspondingly, which is not limited in the present disclosure.

It should be noted that, each of the processing component 3 and the control component 7 in the present disclosure may be a single processing chip, such as an MCU (microcontroller unit), or may also be a module consisting of a plurality of components executing processing or controlling function, or may even be a same chip or module with both functions of the processing component 3 and the control component 7, which is not limited in the present disclosure.

Based on the screen module of the mobile device according to the aspects above, the present disclosure further provides a corresponding fingerprint acquisition solution, which will be introduced below in detail.

Figure 8:
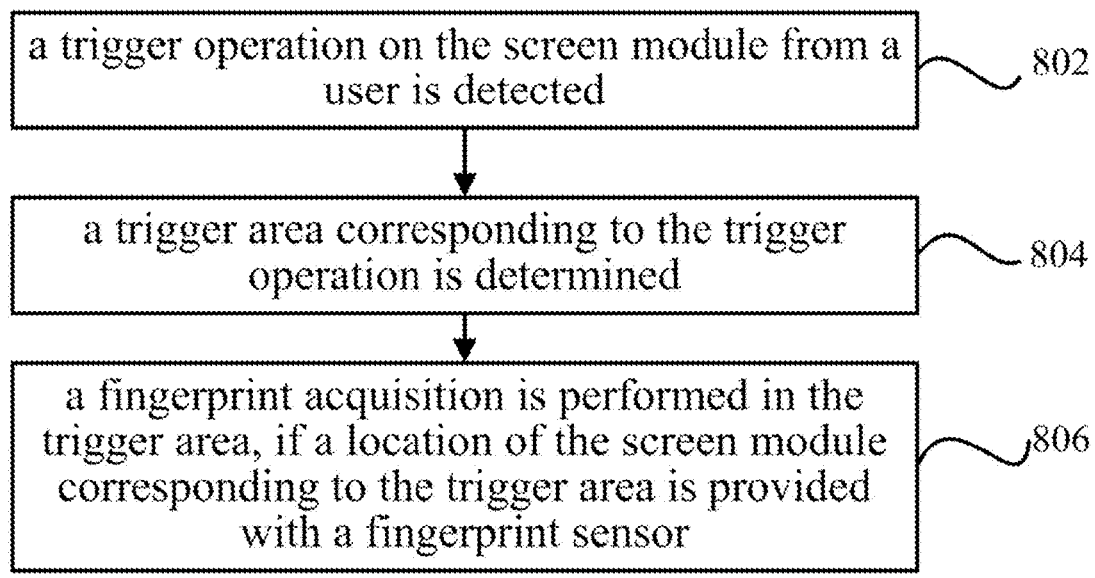
FIG. 8 is a flow chart of a method for acquiring fingerprint, according to an example aspect of the present disclosure.

FIG. 8 is a flow chart of a method for acquiring fingerprint, according to an example aspect. As shown in FIG. 8, the method is applied on a screen module of a mobile device according to any one of aspects above. The method may comprise the following steps.

In step 802, a trigger operation on the screen module from a user is detected.

In step 804, a trigger area corresponding to the trigger operation is determined.

In this aspect, a trigger detection structure may be disposed in the screen module, so as to detect the trigger operation on the screen module and determine a corresponding trigger area.

As an example aspect, if the screen module comprises a touch function assembly, the touch function assembly may be used as the trigger detection structure to detect a touch operation on the screen module from the user. For example, the touch function assembly may comprise a touch screen, a corresponding transmission line, and a control chip.

As another example aspect, if the screen module comprises a pressure detection assembly, the pressure detection assembly may be used as the trigger detection structure to detect a pressing operation on the screen module from the user. For example, the pressing detection assembly may comprise a pressure sensor, a corresponding transmission line, and a control chip.

Both the touch function assembly and the pressure detection assembly are used as examples for illustration, and obviously the trigger detection structure may also be realized via other structure, which is not limited in the present disclosure.

In step 806, a fingerprint acquisition is performed in the trigger area, if a location of the screen module corresponding to the trigger area is provided with a fingerprint sensor.

In this aspect, as an example aspect, if the fingerprint sensors 1 disposed in the screen module have a lower power consumption, all the fingerprint sensors 1 may maintain a normally-on state, such that at any moment when the user touches the area provided with the fingerprint sensor 1 of the screen module with his/her finger, a corresponding fingerprint acquisition may be performed.

As another example aspect, in order to reduce a possible power consumption loss caused by the fingerprint sensor 1 as much as possible, particularly when there are a great number of fingerprint sensors 1, these fingerprint sensors may maintain a normally-off state, and in conjunction with the trigger detection structure disposed in the screen module, the fingerprint sensors 1 may be controlled sequentially to switch on or off, so as to reduce both the number of the fingerprint sensors 1 which are in on-state and a corresponding time when the fingerprint sensors are in on-state.

Figure 9:
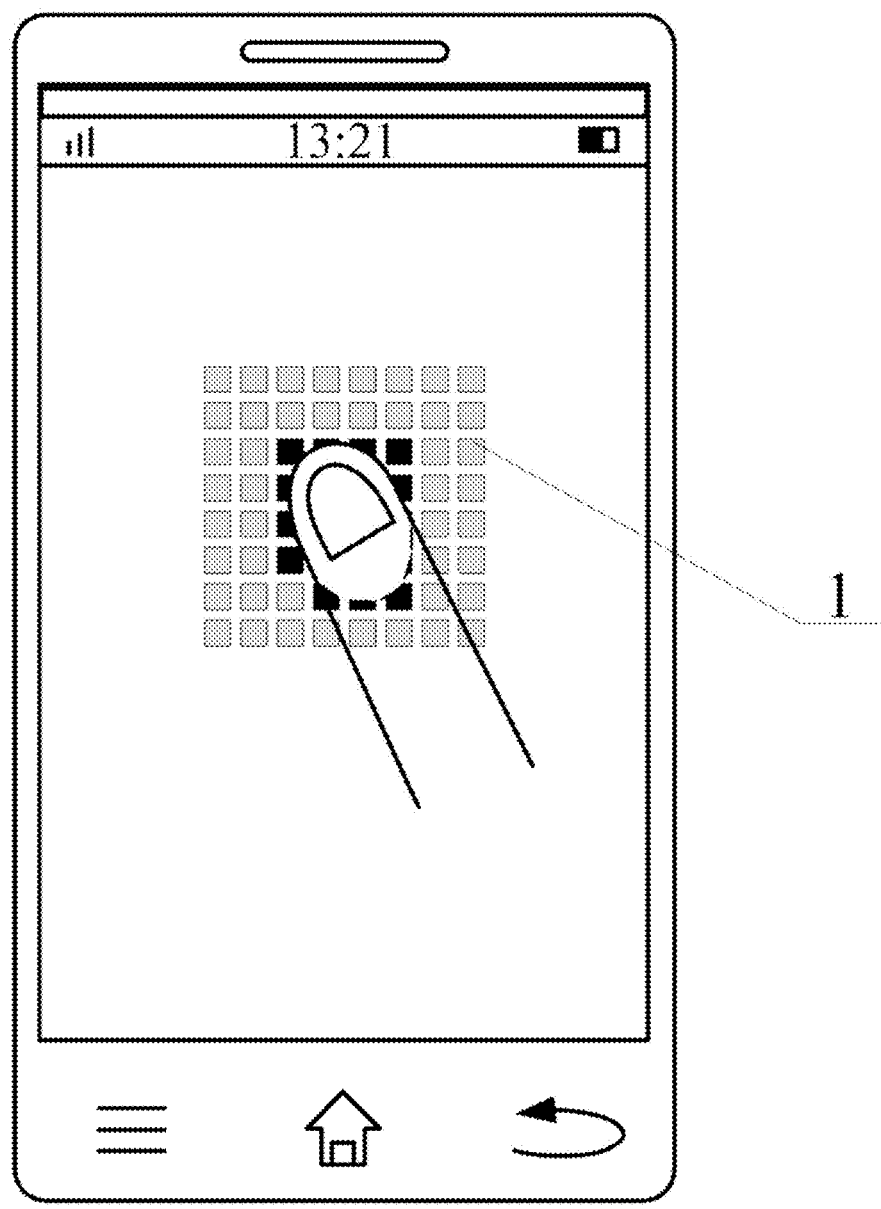
FIG. 9 is a schematic diagram illustrating yet another screen module of a mobile device, according to an example aspect of the present disclosure.

As shown in FIG. 9, although a great number of fingerprint sensors 1 arrange in a rectangle array of a larger area, by detecting the trigger operation of the user by the trigger detection structure, it is only required to switch a partial of the fingerprint sensors 1 in the rectangle array (black fingerprint sensors 1 shown in FIG. 9) to an on-state during an existence of the trigger operation, and to recover the partial of the fingerprint sensors 1 to a normally-off state after the trigger operation disappears, such that the power consumption loss is reduced to the maximum extent in the case of ensuring the fingerprint acquisition.

Figure 10:
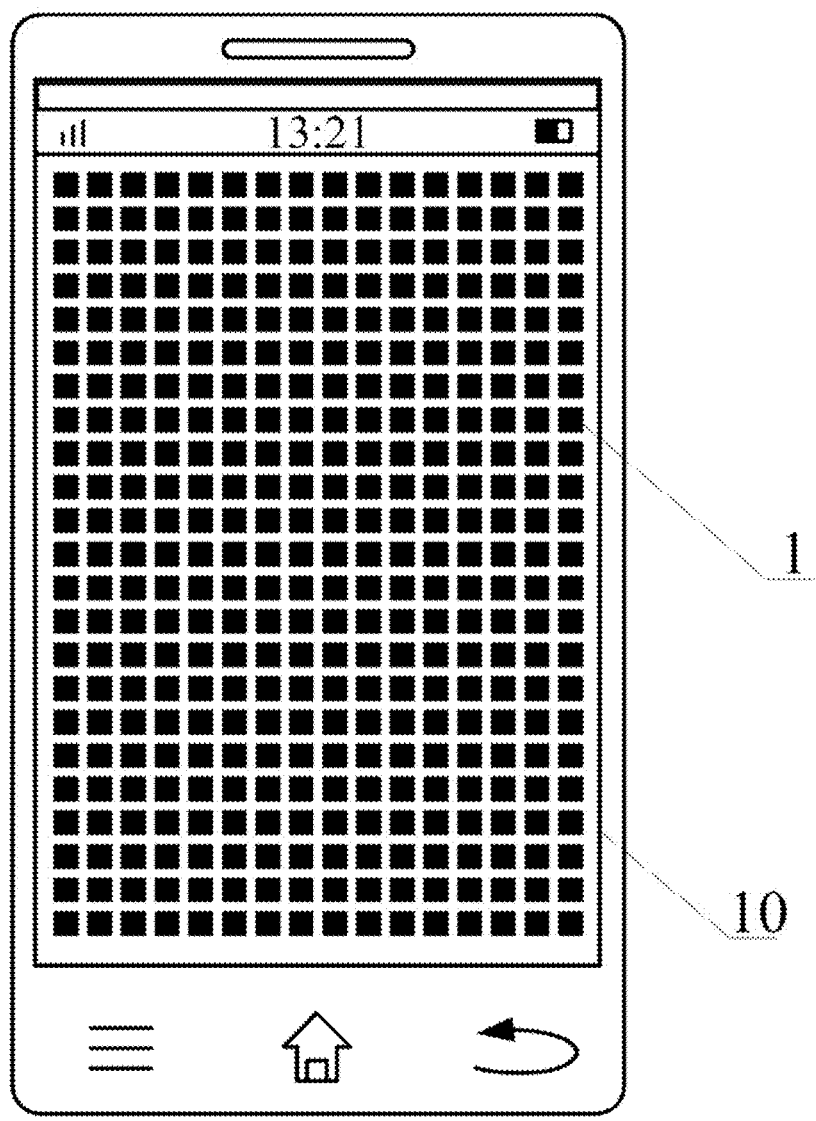
FIG. 10 is a schematic diagram illustrating yet another screen module of a mobile device, according to an example aspect of the present disclosure.

In this aspect, as shown in FIG. 10, the fingerprint sensor 1 may be arranged in the content displaying area 10 of the screen module, such that wherever the user performs the trigger operation within the content displaying area 10, the fingerprint sensor 1 at the corresponding location may implement the fingerprint acquisition. Compared with a technical solution in the related art that the fingerprint sensor 1 is disposed on a back surface or keys of a front surface of the mobile device, the fingerprint acquisition area of the present disclosure will not be limited to an area of a single key. Meanwhile, since the fingerprint sensor 1 is located in the content displaying area 10 of the screen module, it is equivalent to overlap a "fingerprint acquisition" functional area and a "content displaying" functional area, such that it is not required to additionally occupy a functional area of the mobile device, thus facilitating a reduction of the length specification and thickness specification of the mobile device, and further sliming and thinning the mobile device.

Meanwhile, for the user, while the fingerprint acquisition is performed, since the content displaying area 10 of the screen module is much greater than an area of a single finger of the user, it is not necessary to "search for" a disposing location of the fingerprint sensor 1, and it only needs to put the finger at any location of the content displaying area 10 of the screen module to realize the fingerprint acquisition operation.

Corresponding to the aspects of the method for acquiring fingerprint described above, the present disclosure further provides aspects of an apparatus for acquiring fingerprint.

Figure 11:
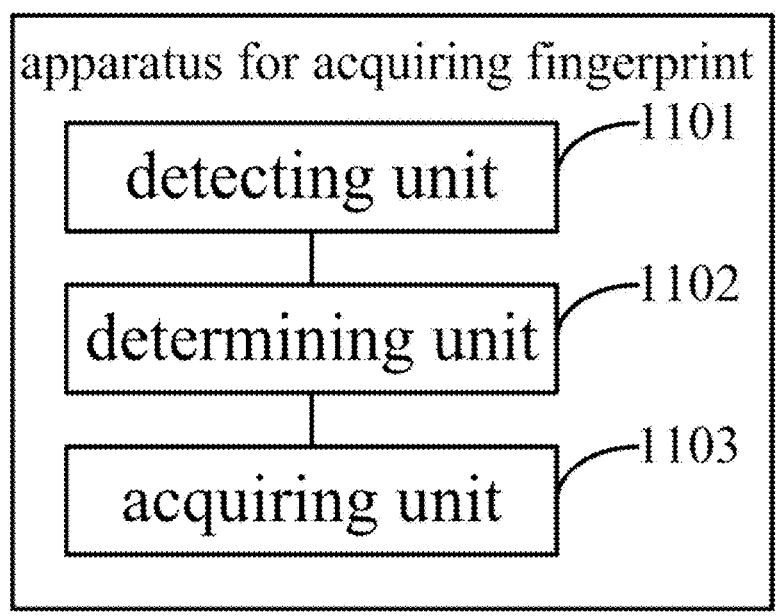
FIGS. 11-13 are block diagrams of an apparatus for acquiring fingerprint, according to an example aspect of the present disclosure.

FIG. 11 is a block diagram of an apparatus for acquiring fingerprint, according to an example aspect. Referring to FIG. 11, the apparatus is applied on a screen module of a mobile device according to any one of aspects above. The apparatus comprises: a detecting unit 1101, a determining unit 1102 and an acquiring unit 1103.

The detecting unit 1101 is configured to detect a trigger operation on the screen module from a user.

The determining unit 1102 is configured to determine a trigger area corresponding to the trigger operation.

The acquiring unit 1103 is configured to perform a fingerprint acquisition in the trigger area, if a location of the screen module corresponding to the trigger area is provided with a fingerprint sensor.

Alternatively, the fingerprint sensor is arranged in a content displaying area of the screen module.

Figure 12:
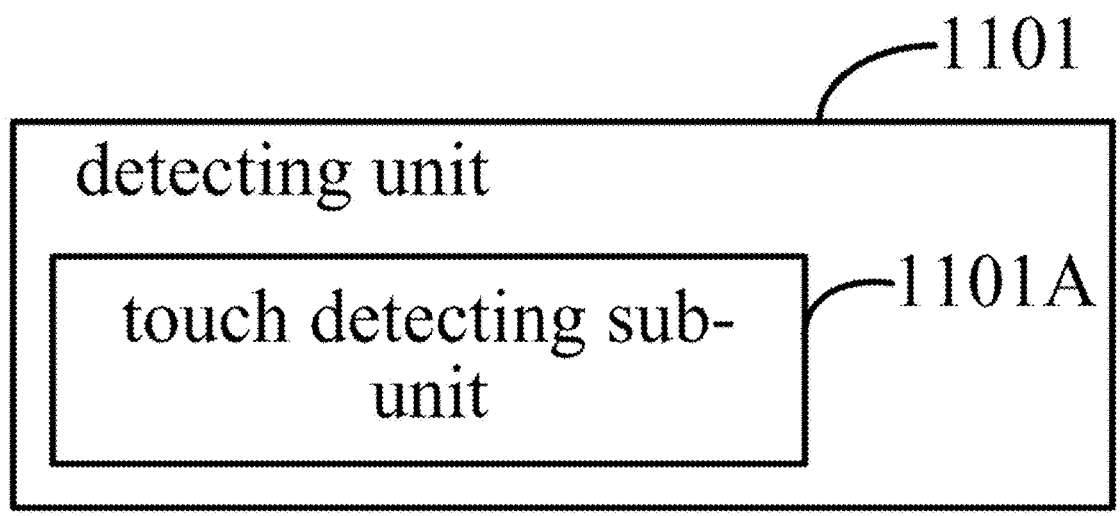

FIG. 12 is a block diagram of another apparatus for acquiring fingerprint, according to an example aspect. Based on the aspect of FIG. 11 described above, in this aspect, the detecting unit 1101 comprises a touch detecting sub-unit 1101A.

The touch detecting sub-unit 1101A is configured to detect a touch operation on the screen module from the user, if the screen module comprises a touch function assembly.

Figure 13:
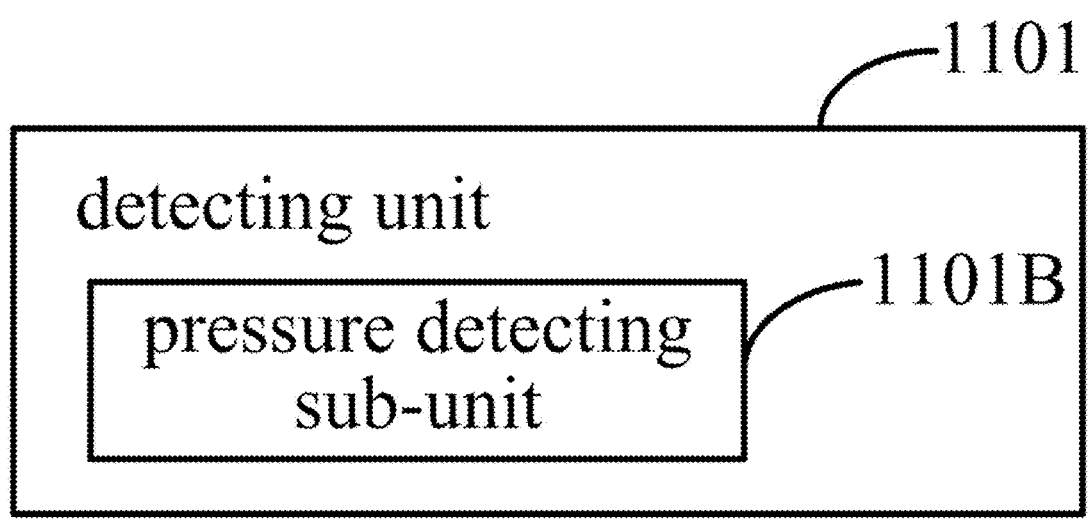

FIG. 13 is a block diagram of another apparatus for acquiring fingerprint, according to an example aspect. Based on the aspect of FIG. 11 described above, in this aspect, the detecting unit 1101 comprises a pressure detecting sub-unit 1101B.

The pressure detecting sub-unit 1101B is configured to detect a pressing operation on the screen module from the user, if the screen module comprises a pressure detection assembly.

With respect to the apparatuses in the above aspects, the specific manners for performing operations for individual modules therein have been described in detail in the aspects regarding the method, which will not be elaborated herein.

Since the aspects of the apparatus are basically corresponding to the aspects of the method, for a related content, reference is made to partial descriptions of the aspects of the method. It is intended that the aspects of the apparatus described above are exemplary only. The units illustrated as separated components may be or may not be physically separated and the components appearing as units may be or may not be a physical unit, that is, the components may be located at one place or may be distributed to a plurality of network units. A partial or all of modules may be selected according to practical requirements to implement the aim of the solution of the present disclosure. It may be understood and implemented by those skilled in the art without creative work.

Accordingly, the present disclosure further provides an electronic device, comprising: a processor; a memory for storing instructions executable by the processor. The processor is configured to: detect a trigger operation on the screen module from a user; determine a trigger area corresponding to the trigger operation; perform a fingerprint acquisition in the trigger area, if a location of the screen module corresponding to the trigger area is provided with a fingerprint sensor.

Accordingly, the present disclosure further provides a terminal, comprising a memory and one or more programs. The one and more programs are stored in the memory and configured to be executed by one or more processors. The one and more programs include instructions for performing the following operations: detecting a trigger operation on the screen module from a user; determining a trigger area corresponding to the trigger operation; performing a fingerprint acquisition in the trigger area, if a location of the screen module corresponding to the trigger area is provided with a fingerprint sensor.

Figure 14:
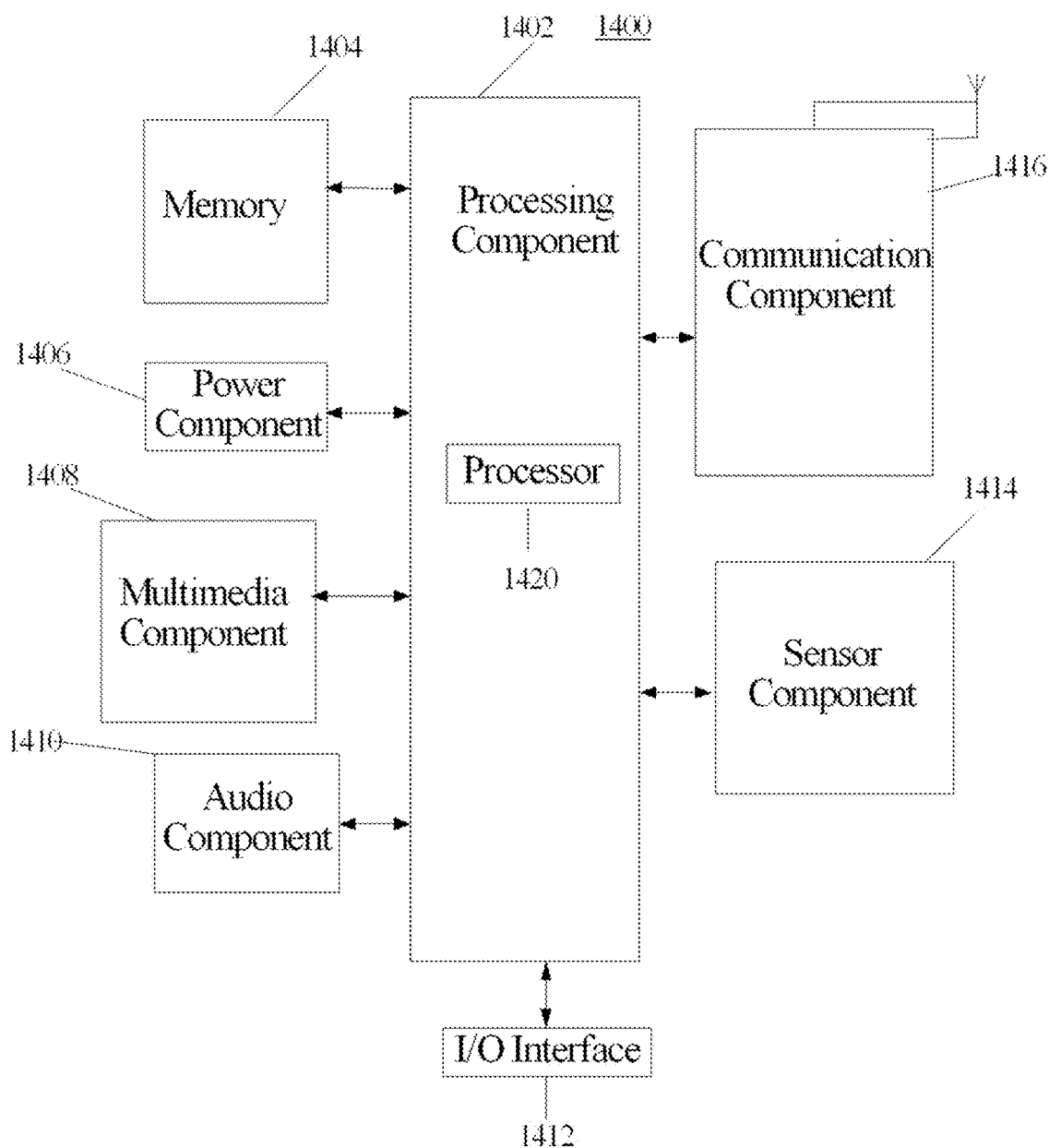
FIG. 14 is a block diagram illustrating a device for acquiring fingerprint, according to an example aspect of the present disclosure.

FIG. 14 is a block diagram of a device 1400 for acquiring fingerprint, according to an example aspect. For example, the device 1400 may be a mobile phone, a computer, a digital broadcast terminal, a messaging device, a gaming console, a tablet, a medical device, exercise equipment, a personal digital assistant, and the like.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1408 includes a front camera and/or a rear camera. The front camera and the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the device 1400 is in an operation mode, such as a call mode, a recording mode, and a voice recognition mode. The received audio signal may be further stored in the memory 1404 or transmitted via the communication component 1416. In some aspects, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some aspects, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 can access a wireless network based on a communication standard, such as WiFi, 2G, or 3G, or a combination thereof. In one exemplary aspect, the communication component 1416 receives a broadcast signal or broadcast associated information from an external broadcast management system via a broadcast channel. In one exemplary aspect, the communication component 1416 further includes a near field communication (NFC) module to facilitate short-range communications. For example, the NFC module may be implemented based on a radio frequency identification (RFID) technology, an infrared data association (IrDA)

technology, an ultra-wideband (UWB) technology, a Bluetooth (BT) technology, and other technologies.

In exemplary aspects, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 1404, executable by the processor 1420 in the device 1400, for performing the above-described methods. For example, the non-transitory computer-readable storage medium may be a ROM, a RAM, a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An apparatus comprising:
    a display screen;
    a processor;
    a plurality of fingerprint sensors configured to acquire fingerprint data, wherein each of the fingerprint sensors is located in a content displaying area of the display screen;
    a plurality of data transmission lines configured to transmit the fingerprint data from the plurality of fingerprint sensors to the processor, wherein a number of the plurality of data transmission lines is less than a number of the plurality of fingerprint sensors, and wherein each of the data transmission lines includes a first end connected to at least one of the fingerprint sensors and a second end connected to the processor; and
    a touch sensor configured to detect a touch operation on the display screen from a user and determine an area corresponding to the touch operation,
    wherein the display screen includes a gated control line including a first end and a second end, wherein the first end of the gated control line is connected to the plurality of fingerprint sensors and the second end of the gated control line is connected to a controller,
    wherein one fingerprint sensor and at least one other fingerprint sensor of the plurality of fingerprint sensors are connected to a same data transmission line of the plurality of data transmission lines,
    wherein the gated control line is configured to control one fingerprint sensor to connect with or disconnect from the same data transmission line based on a control instruction of the controller, such that the same data transmission line is connected with only one fingerprint sensor at a time.

2. The apparatus of claim 1,
    wherein the display screen includes a liquid crystal display (LCD), and
    wherein a vertical projection of at least one of the fingerprint sensors is located within a vertical projection of a black matrix area of a sub-pixel of the LCD.

3. The apparatus of claim 2, wherein the at least one of the fingerprint sensors is disposed on a surface of a color filter of the LCD.

4. The apparatus of claim 2, wherein the plurality of fingerprint sensors are disposed adjacently to each other within a predetermined area of the display screen.

5. The apparatus of claim 1, wherein an output of at least one of the fingerprint sensors is connected to the same data transmission line via a switch, and the gated control line is connected to a control terminal of the switch.

6. The apparatus of claim 1, further comprising:
    a first row of fingerprint sensors in a first edge direction of the display screen that is connected to the same data transmission line; and
    a second row of fingerprint sensors in a second edge direction of the display screen that is connected to a same gated control line, wherein the first edge direction is perpendicular to the second edge direction.

7. The apparatus of claim 1, wherein at least one of the fingerprint sensors is in a continuous on state.

8. The apparatus of claim 1,
    wherein at least one of the fingerprint sensors is located in the area and is configured to activate when the touch operation is detected by the touch sensor.

9. The apparatus of claim 8, wherein the touch sensor is configured to detect at least one of a finger swipe and a finger tap.

10. The apparatus of claim 8, wherein the touch sensor includes a pressure sensor that is configured to detect a pressing operation on the display screen.

11. A method comprising:
    acquiring fingerprint data, via a plurality of fingerprint sensors, wherein each of the fingerprint sensors is located in a content displaying area of a display screen;
    transmitting, via a plurality of data transmission lines, the fingerprint data from the plurality of fingerprint sensors to a processor, wherein a number of the plurality of data transmission lines is less than a number of the plurality of fingerprint sensors, and wherein each of the data transmission lines includes a first end connected to at least one of the fingerprint sensors and a second end connected to the processor;
    detecting, via a touch sensor, a touch operation on the display screen from a user; and
    determining, via the touch sensor, an area corresponding to the touch operation,
    wherein the display screen includes a gated control line including a first end and a second end, wherein the first end of the gated control line is connected to the plurality of fingerprint sensors and the second end of the gated control line is connected to a controller,
    wherein one fingerprint sensor and at least one other fingerprint sensor of the plurality of fingerprint sensors are connected to a same data transmission line of the plurality of data transmission lines, wherein the gated control line is configured to control one fingerprint sensor to connect with or disconnect from the same data transmission line based on a control instruction of the controller, such that the same data transmission line is connected with only one fingerprint sensor at a time.

12. The method of claim 11, wherein detecting the touch operation includes detecting a pressing operation on the display screen via a pressure sensor.

13. An electronic device comprising:
a display screen;
a processor;
a plurality of fingerprint sensors connected to the processor by a plurality of data transmission lines, wherein each of the data transmission lines includes including a first end and a second end, wherein the first end is connected to at least one of the plurality of fingerprint sensors and the second end is connected to the processor, wherein the display screen includes a gated control line including a first end and a second end, wherein the first end of the gated control line is connected to the plurality of fingerprint sensors and the second end of the gated control line is connected to a controller, wherein one fingerprint sensor and at least one other fingerprint sensor of the plurality of fingerprint sensors are connected to a same data transmission line of the plurality of data transmission lines, wherein the gated control line is configured to control one fingerprint sensor to connect with or disconnect from the same data transmission line based on a control instruction of the controller, such that the same data transmission line is connected with only one fingerprint sensor at a time.

14. The electronic device of claim 13, wherein the processor is further configured to detect at least one of a finger swipe and finger tap via a touch sensor.

15. The electronic device of claim 13, wherein the processor is further configured to detect a pressing operation on the display screen via a pressure sensor.

* * * * *